United States Patent Office

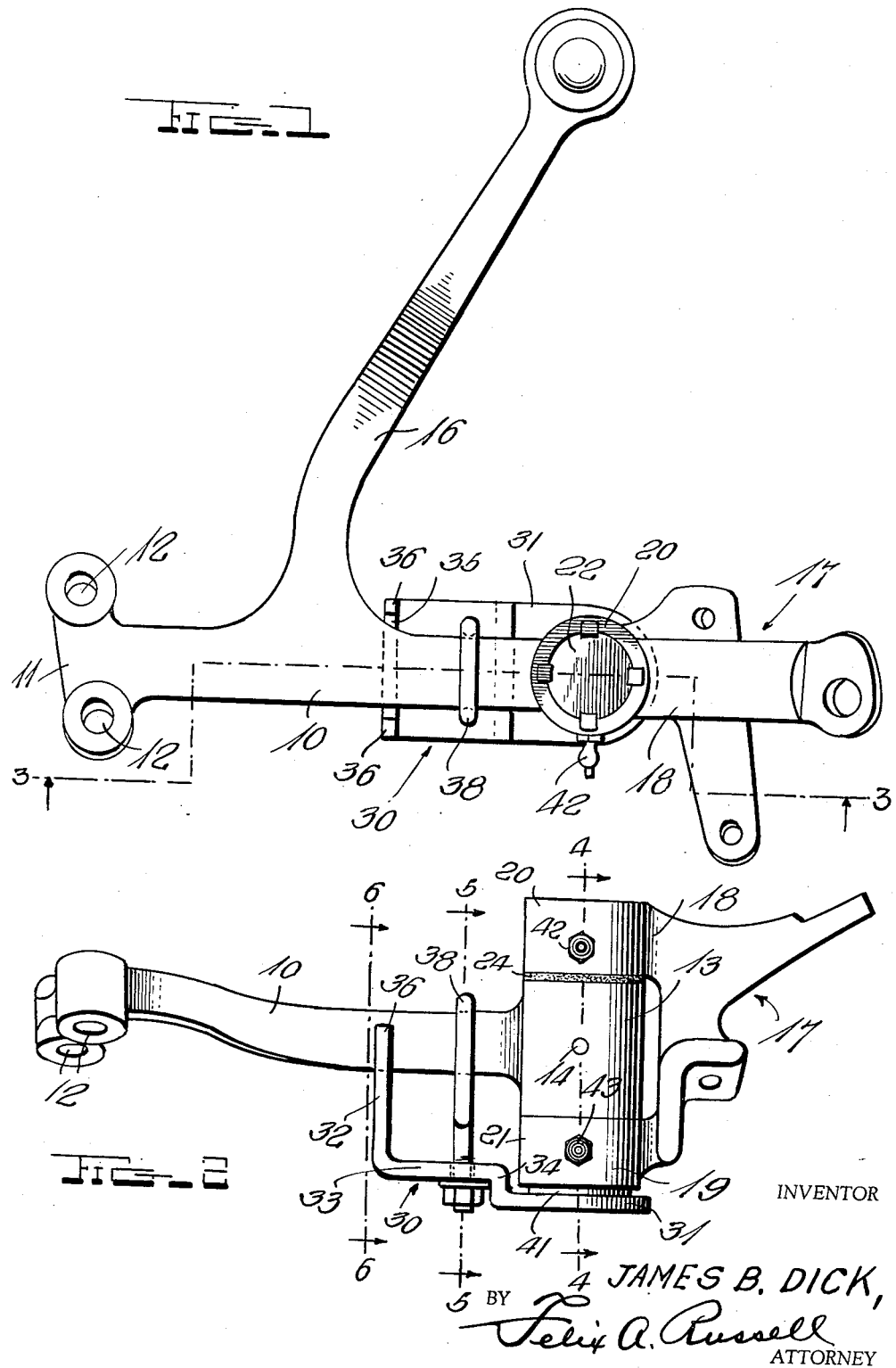

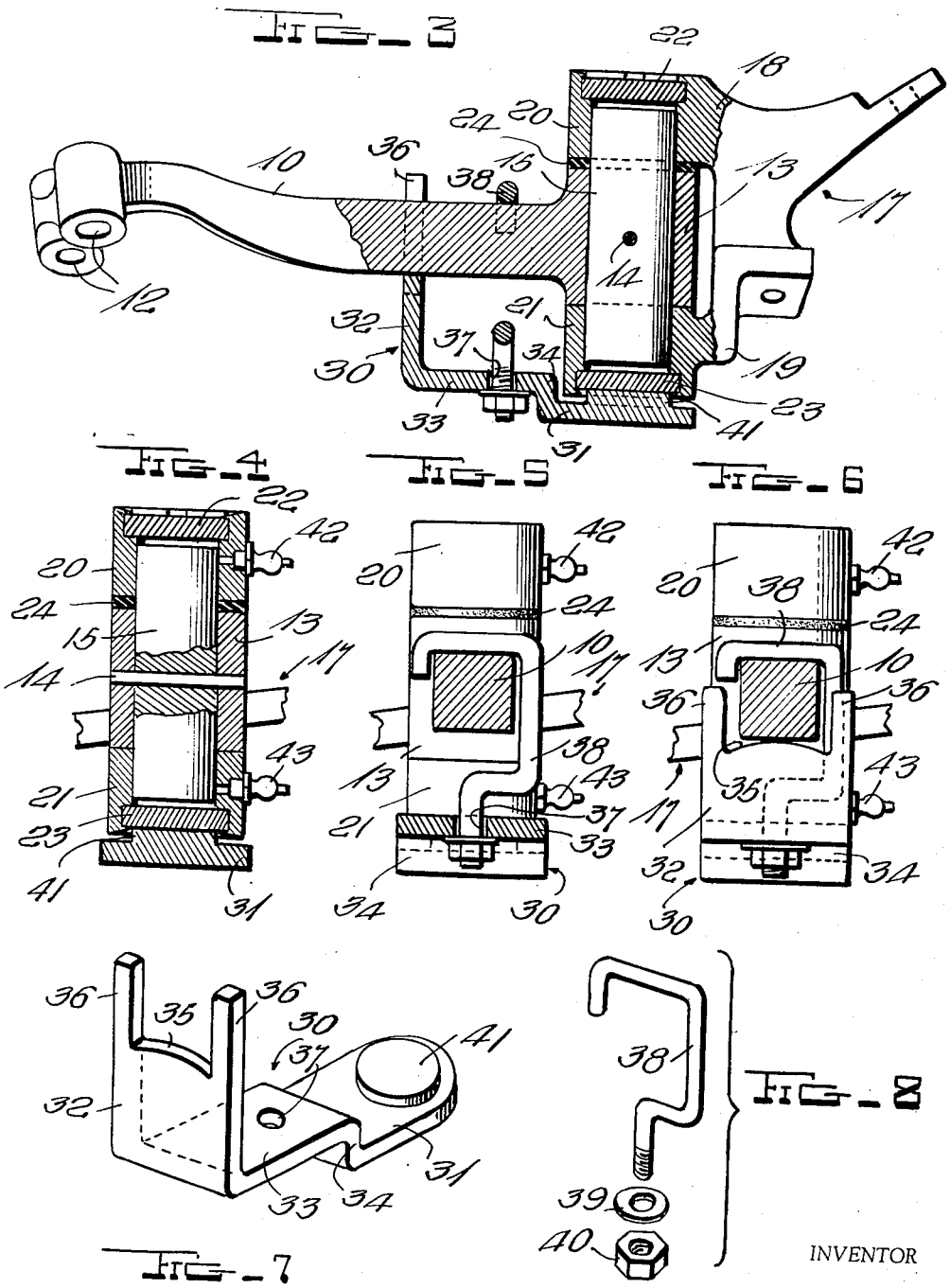

2,811,369
Patented Oct. 29, 1957

2,811,369
IDLER ARM ADJUSTABLE FOR VEHICLE STEERING MECHANISM

James B. Dick, Birmingham, Ala.

Application February 15, 1954, Serial No. 410,277

2 Claims. (Cl. 280—95)

The present invention relates to an idler arm adjuster and it consists in the combinations, constructions and arrangements of parts herein described and claimed.

Generally the present invention consists of a device having means for providing a stabilizing effect upon the idler arm of a steering mechanism of an automobile. The device is simple in nature and capable of quick and easy attachment to the idler arm aforesaid. The device includes as one of its important features a self-centering means for a friction bearing plate which forms a part of the invention in itself. The device provides a maximum of bearing surface while causing no thrust against the conventional shaft anchor pin. In addition, the device provides more clearance between the idler arm and the conventional oil pan than in other devices of this nature.

It is accordingly an object of the invention to provide a device of the character set forth which is simple in construction, inexpensive to manufacture and yet effective and efficient in use.

Another object of the invention is to provide, in a device of the character set forth, a novel friction bearing plate forming a part of the invention.

A further object of the invention is to provide, in a device of the character set forth, a novel convex bearing surface for a bracket forming a part of the invention, such convex surface acting as a self-centering means for the friction bearing plate above-mentioned.

Still another object of the invention is to provide a device of the character set forth which will provide a maximum of clearance between the idler arm to which it is attached and the conventional oil pan associated therewith.

A further object of the invention is to provide a device of the character set forth wherein the effective thrust of the device is downwardly upon the idler arm rather than in an upward direction as per conventional practice.

Other and further objects of the invention will become apparent from a reading of the following specification taken in conjunction with the drawings, in which:

Figure 1 is a plan view of an embodiment of the invention,

Figure 2 is a side elevational view thereof,

Figure 3 is a sectional view taken substantially along line 3—3 of Figure 1,

Figure 4 is a sectional view taken along line 4—4 of Figure 2,

Figure 5 is a sectional view taken along line 5—5 of Figure 2,

Figure 6 is a sectional view taken along line 6—6 of Figure 2,

Figure 7 is a perspective view of a bracket and friction bearing plate forming a part of the invention, and Figure 8 is an exploded perspective view of a bolt forming a part of the invention.

Referring more particularly to the drawings, there is shown therein an idler arm 10 whose rearward end is somewhat enlarged, as indicated at 11, and provided with a pair of openings 12, one at either side thereof, for the connection thereto of conventional tie rods (not shown).

The forward end of the idler arm 10 terminates in a sleeve 13 in which is affixed by means of a transversely extending lock pin 14, a bearing pin 15. A pitman 16 is integrally formed with one side of the idler arm 10 and extends angularly therefrom to connect with the conventional steering mechanism of an automotive vehicle (not shown).

An idler arm bracket is generally indicated at 17 and is provided with conventional means for attachment to the frame (not shown) of the vehicle and is also provided with rearwardly extending upper and lower fork arms 18 and 19 which terminate in integrally formed upper and lower bearings 20 and 21, respectively.

Affixed in any suitable manner within the bearing 20 in spaced relation to the upper end thereof is a welsh plug 22. A like welsh plug 23 is affixed within the bearing 21 in spaced relation to the lower end thereof.

A felt washer 24 surrounds the pin 15 in interposed relationship between the upper end of the member 13 and the bearing 20.

It will be apparent that the bearings 20 and 21 are in parallel spaced relationship to each other and that the pin 15 extends into both the bearings 20 and 21 terminating at each of its ends in spaced relationship to the plugs 22 and 23, respectively.

It will be further understood that all of the foregoing description defines conventional mechanism. The device embodying the present invention consists of a bracket generally designated at 30 comprising a base plate 31, a vertically extending rear wall 32 and an intermediate horizontally extending raised portion 33 which integrally interconnects the base plate 31 and the wall 32, a shoulder 34 being provided between the raised portion 33 and the base plate 31.

The upper edge of the wall 32 is convex, as indicated at 35 and each side thereof is provided with an integrally formed upwardly extending arm 36.

The intermediate portion 33 is centrally provided adjacent the shoulder 34 with a vertical opening 37 for the reception therethrough of the stem of a hook bolt 38, the bolt being provided with a washer 39 and nut 40. The forward end of the base plate 31 is preferably rounded and has integrally affixed thereon an upwardly extending circular friction bearing plate 41. Bearings 20 and 21 are each provided with grease fittings 42 and 43, respectively, such fittings also being conventional in nature.

It will be apparent that the device of the present invention is mounted upon the idler arm and its associated structure by placing the friction bearing plate 41 against the lower face of the plug 23 while at the same time the convex upper edge 35 of the wall 32 bears against the underside of the idler arm 10, the arms 36 straddling the idler arm 10. The bracket 30 is maintained in this position by means of the hook bolt 38, the hook portion of which encompasses the upper face of the idler arm 10 while the shank portion thereof is extended through the opening 37 and the washer 39 and nut 40 mounted upon the lower end thereof to provide an upward force to the friction bearing plate 41 upon the plug 23 while a downward force is applied to the member 13. It will also be seen that the friction bearing plate 41 which has a flat upper face will be brought into proper flat contact with the flat lower face of the plug 23 by means of the convex upper edge 35 which causes the bracket 30 to "seek its own level" when the hook bolt 38 is tightened into position by means of the nut 40. It will thus be seen that when the device is so mounted, it will prevent entirely any of the noise customarily accounted for due to vibration and the repeated contacts of the member 13 with the adjacent bearings 20 and 21. Likewise it will be apparent that since the device takes up such a minimum of space that no alteration of the conventional parts of the vehicle is necessary and that there will remain sufficient clearance between the idler arm 10 and the conventional oil pan.

While but one form of the invention has been shown and described herein, it will be readily apparent to those skilled in the art that many minor modifications may be made without departing from the spirit of the invention or the scope of the appended claims.

What is claimed is:

1. In combination with an idler arm having a vertical sleeve formed integrally with one end thereof, an idler arm bracket having an upper and a lower bearing encompassing and in alignment with said sleeve, a plug affixed within each of said bearings in spaced relation to the outer end thereof, and a bearing pin affixed within said sleeve and extending into each of said bearings to points in spaced adjacent relationship to said plugs, the provision of a support bracket having a horizontal base plate, an intermediate horizontal portion, a shoulder integrally interconnecting one end of said intermediate portion with said base plate, said intermediate portion being in a higher plane than said base plate and having a centrally disposed opening therethrough adjacent said shoulder, and a vertical wall integrally connected to the other end of said intermediate portion and having a convex upper edge bearing against the underside of said idler arm, a pair of arms each extending upwardly from an opposed end of said upper edge whereby to straddle said idler arm, a hook bolt having its shank extending downwardly through said opening and having its hook end encompassing the upper side of said idler arm, said bolt having its lower end in substantially the same horizontal plane as that of the lower face of said base plate, a circular bearing plate affixed atop said base plate adjacent its outer end and contacting the plug in said lower bearing, and a nut threaded to the lower end of said bolt.

2. In combination with an idler arm having a vertical sleeve formed integrally with one end thereof, an idler arm bracket having an upper and a lower bearing encompassing and in alignment with said sleeve, a plug affixed within each of said bearings in spaced relation to the outer end thereof, and a bearing pin affixed within said sleeve and extending into each of said bearings to points in spaced adjacent relationship to said plugs, the provision of a support bracket having a circular friction bearing plate affixed thereto, means for forcibly urging said bearing plate into contact with the plug in said lower bearing, and means for aligning said bearing plate in full flat contact with said last-mentioned plug, said aligning means comprising an upwardly extending wall carried by said bracket and having a convex upper edge bearing against the underside of said idler arm, and a pair of arms each extending upwardly from opposed ends of said upper edge of said wall, said pair of arms straddling said idler arm.

References Cited in the file of this patent

UNITED STATES PATENTS

| | | |
|---|---|---|
| 1,482,286 | Colley | Jan. 29, 1924 |
| 2,208,325 | Krutsch | July 16, 1940 |
| 2,588,544 | Langer | Mar. 11, 1952 |
| 2,620,202 | Coleman | Dec. 2, 1952 |
| 2,684,260 | Hawley | July 20, 1954 |